United States Patent [19]

Karnopp

[11] Patent Number: 5,139,119
[45] Date of Patent: Aug. 18, 1992

[54] APPARATUS FOR DAMPING RESILIENT VEHICLE WHEEL SUSPENSION SYSTEMS

[75] Inventor: Dean Karnopp, Davis, Calif.
[73] Assignee: Robert Bosch GmbH, Stuttgart, Fed. Rep. of Germany
[21] Appl. No.: 684,138
[22] Filed: Apr. 11, 1991

Related U.S. Application Data

[63] Continuation of Ser. No. 390,031, Aug. 7, 1989, abandoned.

[30] Foreign Application Priority Data

Aug. 13, 1988 [DE] Fed. Rep. of Germany ....... 3827538

[51] Int. Cl.$^5$ .............................................. F16F 9/46
[52] U.S. Cl. ..................................... 188/299; 137/503; 188/319; 251/209
[58] Field of Search .................... 188/299, 319, 322.15; 137/503; 251/209; 280/714

[56] References Cited

U.S. PATENT DOCUMENTS

| | | | |
|---|---|---|---|
| 967,285 | 8/1910 | Wilson | 188/319 |
| 3,827,538 | 8/1924 | Morgan | 188/299 X |
| 4,530,425 | 7/1985 | Veaux et al. | 188/299 |
| 4,671,392 | 6/1987 | Wossner | 188/299 |
| 4,685,545 | 8/1987 | Fannin et al. | 188/299 |
| 4,743,000 | 5/1988 | Karnopp | 188/299 X |
| 4,800,995 | 1/1989 | Bernhardt et al. | 188/299 X |
| 4,821,851 | 4/1989 | Kruckemeier et al. | 188/319 |
| 4,826,207 | 5/1989 | Yashioka et al. | 188/319 X |

FOREIGN PATENT DOCUMENTS 83847 5/1984 Japan ................... 188/319

Primary Examiner—George E. A. Halvosa
Attorney, Agent, or Firm—Edwin E. Greigg; Ronald E. Greigg

[57] ABSTRACT

In an apparatus for damping resilient wheel suspension systems in vehicles and the like having a piston/cylinder assembly, instantaneous, dynamic driving conditions are detected with sensors and serve to control the fluid flow through damping valves. The operative damping force at any time is controlled in such a way as to produce passive and active damping force components. Whenever the instantaneous course of motion requires a supply of energy from outside, the existing damping force is substantially nullified (semi-active damping). Separate options for acting upon the controlled pressure fluid are provided for the compression stage and tension stage; these options comprise the series circuit of two separate valves, one for each direction of motion (tension/compression stage). Four valves are thus present, with one each in the tension stage and one each in the compression stage for determining the active damping component and similarly one each for determining the passive damping component. The two valves for the passive damping component and the two for the active damping component are each externally adjustable.

8 Claims, 4 Drawing Sheets

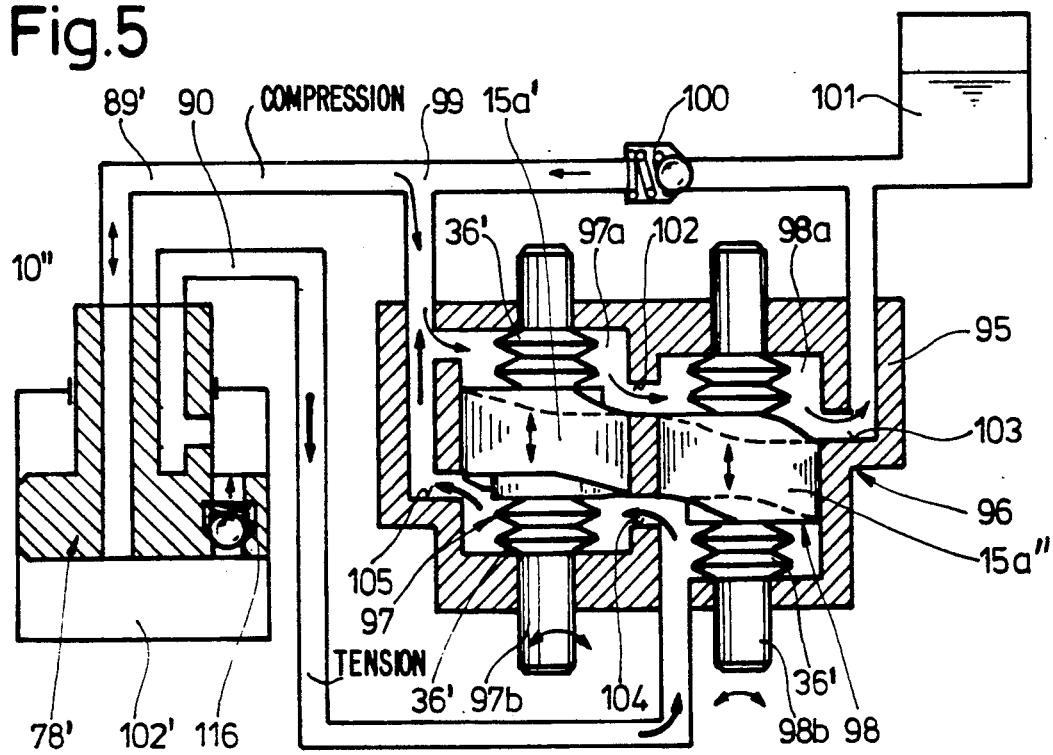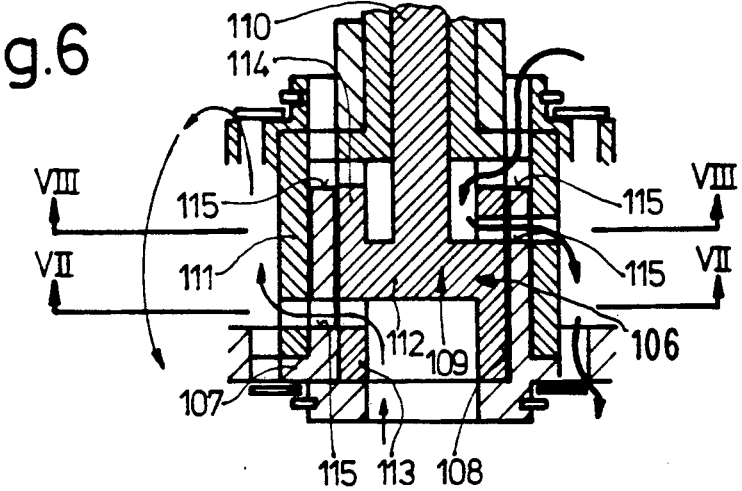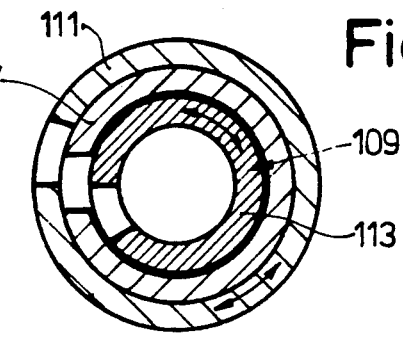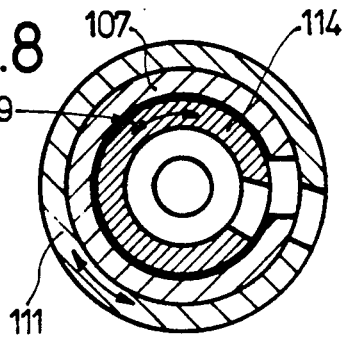

APPARATUS FOR DAMPING RESILIENT VEHICLE WHEEL SUSPENSION SYSTEMS

This is a continuation of copending application Ser. No. 07/390,031 filed on Aug. 7, 1989, now abandoned.

BACKGROUND OF THE INVENTION

The invention relates to an apparatus for damping resilient wheel suspension systems in vehicles. In a known damping system of this type (German Offenlegungsschrift 35 24 862) which is the same as U.S. Pat. No. 4,936,423, to attain a so-called semiactive suspension concept, a division into passive and active damping parts is performed. An active damping part is as it was simulated: Whenever the instantaneous progress of the suspension or damping would require a supply of energy from outside, or in other words active intervention into the suspension process, existing damping options are controlled in sign (+or −) and in an amount such that the error function becomes a minimum; in other words, whenever a standard shock absorber or shock absorber strut requires a rapid induction of active compression energy, the operative damping forces for both the tension and compression stages of the shock absorber or strut are substantially nullified, for instance by opening corresponding damping valves completely or partway, depending on the conditions desired.

A semi-active suspension concept of this kind makes use of the possible advantages of so-called passive suspension, which requires no such external energy to vary rapidly ensuing damping or suspension processes, and those of so-called active suspension, in which energy is arbitrarily supplied as it was from outside the suspension region from an independent energy source such as a hydraulic pump, and combines the advantages of both systems.

OBJECT AND SUMMARY OF THE INVENTION

On the basis of the known semi-active damping control in resilient vehicle wheel suspension systems, it is an object of the invention to devise novel, integrated and in particular compact structures that react sufficiently fast and are capable of being built directly into, or attached to, each individual shock absorber unit or strut.

The invention attains this object with a definitive characteristics recited herein, and has an advantage that a desired separate damping control for the compression and tension stages is made possible by two groups of valves, which are triggered or in other words varied in their cross section in such a way that the passive and active damping components undergo separate adjustment.

It is particularly advantageous that the two valves determining the passive damping and the active damping are at the same time double valves, which perform an adjustment of the flow cross sections for the compression and tension stages separately but simultaneously.

The valves used are rotary valves, the flow cross sections of which are adjusted by relative rotation with respect to stationary parts; the various valves connected in series with one another for the passive and the active damping components may be nested within one another and preferably concentrically, in such a way that the entire valve region can be disposed in the piston or piston rod of a damping element embodied in the manner of a shock absorber. Because the piston rod is secured in stationary fashion, although flexibly, on the body, it becomes possible for the control forces necessary for actuating the passive and active damping force valves to be introduced into the region of the piston or piston rod, preferably by rotating hollow shafts relative to one another.

A further particularly advantageous feature is that in addition to the rotational motions for the valves, which are derived from external control forces, the actual valve body that effects the flow control is retained resiliently, for instance between curved washers of arbitrary design, in such a way that in response to prevailing pressure conditions it can additionally execute a more or less pronounced axial motion, which is a supplementary influence, in this special case an asymmetrical one, on the flow control of the valves.

Further advantageous features of and improvements to the apparatus disclosed for damping resilient wheel suspension systems are attainable with the characteristics recited herein. For instance, the two concentrically disposed double valves may comprise an inner rotary valve and a further outer double valve. The inner rotary valve is responsible for the active damping force component, and its outer cylinder jacket has a contour of varying height around the jacket; with continuous variation, the cross sections of openings located in a jacket surrounding the cylindrical form of the valve body are uncovered or covered. Farther outward, adjoining the inner, stationary part, the further double valve may be embodied in the form of an apron-like, downwardly hanging cylinder wall, which has transverse bores that are more or less in alignment, depending on the rotational position assumed, with flow openings correspondingly located on both sides.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5 accordingly schematically shows a valve region in section, which may be associated with a correspondingly semi-active McPherson strut to be secured to the vehicle body, in which the flow of pressure fluid takes place in the hollow piston rod;

FIG. 6 shows an alternative embodiment of a valve region, likewise with two concentrically disposed valve structures; and FIGS. 7 and 8 are cross sections taken along the lines VII and VIII, respectively, of FIG. 6.

DESCRIPTION OF THE PREFERRED EMBODIMENTS

Figure 1:
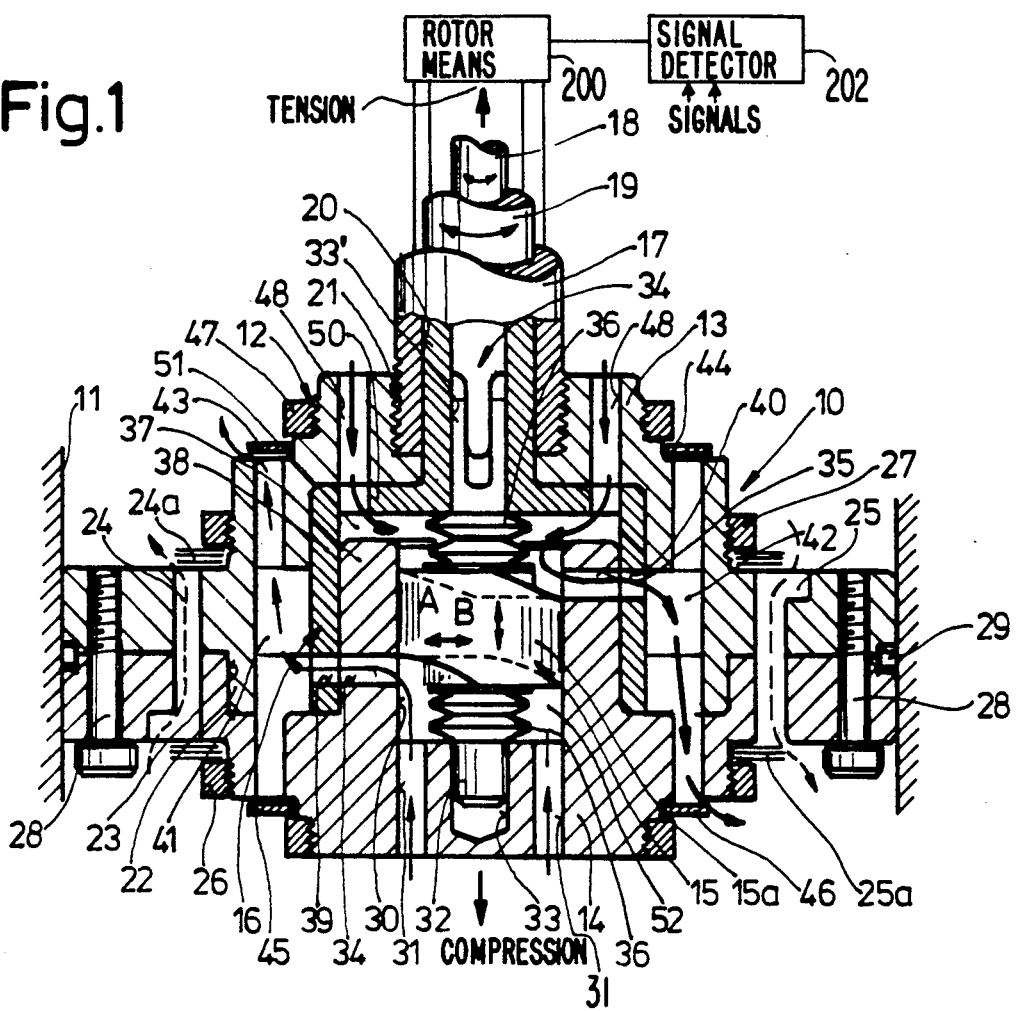
FIG. 1 shows an exemplary embodiment of the valve region of a semi-active damping means in cross section, this valve region being disposed in the piston of a single-tube structure embodied in the manner of a shock absorber, and the valve actuation being effected via hollow shafts that are guided in the piston rod.

FIG. 1 is a detail primarily of the piston 10 of a shock-absorber-like structure, for instance a single-tube shock absorber, of which the annular wall of the cylinder receiving the piston is shown only in part, at 11.

The entire valve unit 12 effecting the semi-active damping force generation is integrated with the damper piston 10; for the sake of easier assembly, the piston comprises an upper housing part 13, embodied approximately like an upside-down key with steps of different diameter on the inside and outside, and a lower, approximately similarly embodied housing part 14 likewise having steps of different diameter on the outside. The upper and lower housing parts 13 and 14 have a plurality of flow conduits, annular walls and annular alignment protrusions, all oriented toward and hence aligned with one another, which will be described in greater detail hereinafter. The primary feature of the valve unit shown in FIG. 1, however, is that an inner or first valve 15, functionally embodied as a double valve, and surrounding it a second valve 16 likewise functioning as a double valve are provided concentrically with one another. Both valves are actuated by rotatable extensions, hereinafter called rotary shafts, extending through the inside of the piston rod 17 secured to the piston 10 driven by any suitable rotor means 200 which receives a signal from a signal detector 202 which detects signals related to different parameters of the body and wheels and connects these signals to control signals. The inner rotary shaft 18 serves to actuate the first double valve 15, which by open- or closed-loop control serves in turn to adjust the active damping force component, while the outer hollow rotary shaft 19 surrounding the inner rotary shaft 18 actuates the second double valve 16, to adjust the passive damping force component. The two rotary shafts 18 and 19 are concentrically guided and supported in a bore 20 of the piston rod 17, which is coaxially secured to the upper housing part 13, preferably by being threaded into it, as shown at 21. A double valve is one that simultaneously adjusts fluid flow from above the valve to below the valve and from below the valve to above the valve. The double valves 15 and 16 are shown clearly in FIG. 1 by the flow arrows where valve 15 controls flow through openings 40 and 34 and valve 16 controls flow through openings 48 and 39.

It should be noted at this point that the terminology, used frequently herein, of semi-active damping with a passive and an active damping force component is described in detail in the aforementioned German Offenlegungsschrift 35 24 862 of the present applicant; thus it is assumed at the outset that these basic terms are known, along with their association for attaining optimal damping actions with bodies moving relative to one another, in particular resilient wheel suspension systems in vehicles.

The structure of the valve unit 12 inside the upper and lower piston housing part 13 will now be described in further detail. The upper housing part 13, viewed from the outside in, has a downwardly protruding annular alignment protrusion 22, which is seated in a corresponding annular recess 23 of the lower piston or housing part 14. Both upper and lower housing parts, which here are also embodied in disklike fashion, have mutually aligned openings 24 and 25, each acting in one direction as check valves, to which end corresponding resilient annular metal sheets or rings 24a, 25a that form the valve bodies are disposed partially covering the openings 24, 25 on one side and are retained on both sides by screwed-on clamping rings 26, 27. As a result, a flow of pressure fluid as indicated by the arrows drawn in dashed lines is possible in one or the other direction in response to exerted tension or compression at a corresponding magnitude, namely whenever the compression is great enough to press the sealing laminations into place.

The two upper and lower housing parts 13 and 14 may be joined to one another by screws 28, provided entirely on the outside and distributed (uniformly) over the circumference, or by some other fastening means. A seal along the annular wall 11 of the cylinder is set in place at 29.

The lower housing part 14 receives the valve body 15a of the first double valve 15 (for the active damping component) in an inner bore 30, leading into which are axially aligned inlet conduits 31 that thus represent inlet pressure conduits. The valve body 15a is of generally cylindrical shape and is seated on the inner rotary shaft 18, or as in the exemplary embodiment shown on a rotary shaft 32, which is supported at both ends in the piston 10, namely at the bottom in a bore 33 in the lower housing part 14 and at the top in the bore 33' of the outer rotary shaft 19. At this point, the rotary coupling of the rotary shaft 32 supporting the inner valve body 15a may be effected by an axial coupling 34, which may comprise a simple telescoping rotary coupling comprising an off-center tang and a recess receiving it. The inner valve body 15a is of generally cylindrical shape, so that it fits flush in the bore 30 receiving it in the lower housing part 14; the cylindrical outer contour of the inner valve body 15a is offset in height, however, or in other words as shown in the drawing extends obliquely from top to bottom in the plane of the drawing and correspondingly around the cylinder wall, as represented by dashed lines extending around the back, so that a valve body 15a of this kind is capable upon executing a rotational motion of either covering or uncovering transverse conduits 34 or 35 which discharge at various heights into the inner bore 30 of the lower housing part. In this way, the inner valve body 15a and these transversely entering conduits 34, 35 form valve mechanisms. In the exemplary embodiment shown, two transverse conduits discharge into the inner bore 30, each separately carrying the pressure fluid (hydraulic oil) for the compression stage and the tension stage, as will be described in further detail hereinafter. The inner valve 15 thus represents a double valve, which upon actuation opens or closes its two component valves simultaneously. This can take place symmetrically or asymmetrically, and as will be readily appreciated depends on the particular structure and shape of the cylindrical surface of the inner valve body 15a, that is, on its "vertical eccentricity".

In a further, particularly preferred embodiment of this inner double valve 15, the actual inner valve body 15a is axially displaceably supported on its rotary axis 32 and is prestressed on both sides in the normal axial center position via disk springs or curved washers 36. As a result, the valve body 15a gains the opportunity of moving both rotationally as indicated by the double arrow A—by the induction of an arbitrary control movement from outside—and axially as indicated by the double arrow B—arbitrarily as a function of prevailing pressure conditions; in both cases, a flow control of the transverse conduits necessarily results.

The same transverse conduits 34, 35 that lead toward the inside perform valve functions for the inner double valve 15, perform valve functions for the outer double valve 16 toward the outside, or in other words in their radial outer end regions.

To this end, the raised stationary annular protrusion 37, which extends upward from the outer housing part 14 and in its interior forms the bore 30 for the inner valve body 15a, is surrounded on the outside by a cup-shaped outer valve body 38, which at the various heights of the stationary transverse conduits 34, 35 has transverse openings 39, 40, which depending on the rotary position assumed by the cylindrical wall of the outer valve body 38 are more or less in alignment with the transverse conduits 34, 35, resulting in second (outer) valves following the first (inner) valves; the second valves are controlled in their flow behavior by the outer rotary shaft 19.

Outside the cylindrical annular wall of the outer valve body 38, the conduits then discharge into chambers 41, 42 on both sides, which are naturally partitioned off from one another over the circumference of the valve unit and are closed off at their top and bottom by lid-like check valves 43, 44, 45, 46. The check valves 43, 44 may be embodied by a common (elastic) annular face, which is placed on the upper housing part 13 on the corresponding outer, stepped protrusion and retained by means of a screw ring 47; the same is true, correspondingly, of the lower check valves 45 and 46.

The outer cup-shaped valve body 38 also merges, tapering upward, with the outer rotary shaft 19, if desired integrally; the overall structure is finally completed with further inlet conduits 48, located radially inward, which axially penetrate the upper housing part 13, initially bordering on the screwed-in piston rod region, and there they meet flow conduits that are always open and therefore extend in a radial curve and are located in the horizontal annular face of the bottom part 50 of the rotating valve body 38.

The lower and upper inlet conduits 31 and 48, leads axially on both sides to the inner and then the outer double valve, which likewise meet free spaces 51, 52 respectively above and below the inner valve body 15a, and from there first pass through the various serially located valve openings of the inner and outer double valve before reaching the outer free spaces 41, 42, and from there extend via the check valves 43, 44, 45, 46 each to the respectively other side.

The course of the function of a valve unit of this kind, integrated with the piston 10 approximately in the manner of a shock absorber is such that both the compression-tension and the active-passive functions can be monitored and controlled separately, so that it is possible to lower the requirements in terms of the frequency behavior of the actuating elements; because of the variable flow opening controls, that is, controls that are variable by means of rotary motion, only slight actuating forces are needed, because virtually no resultant compressive forces need to be counteracted.

Corresponding flexible elements in the region of the check valves enlarge the pressure range and thus reduce the progressivity in the response behavior and limit the maximum forces arising.

The novel conception of the inner rotary valve is particularly advantageous and important; this valve performs the active damping force control and if desired a rotationally asymmetrical area modulation for the buildup of damping forces for the tension and compression stage, combined with an axial motion (of the inner valve body) controlled by spring force, as a result of which the progressive increase in the damping forces can be reduced and kept within limits.

The basic function is such that upon motion of the piston 10 in the compression direction, or downward in the plane of the drawing in FIG. 1, correspondingly positively displaced pressure fluid flows through the conduits 31, first to the inner valve body 15a and through the (lower) valve openings furnished by it, depending on the type of active damping force variation, through the transverse conduit 34 to the adjoining outer valve region of passive damping force variation, namely the opening 39 in the outer valve body 38 having the transverse conduit 34 and finally into the free space 41 on the left in the plane of FIG. 1, from which the passage is upward, via the check valve 43 opened in accordance with the operative pressure, or in other words into the upper pressure chamber, merely suggested in the drawing here, of the piston/cylinder assembly of the shock absorber unit.

Contrarily, if a motion of the piston 10 in the tension direction takes place, as indicated by the corresponding arrow, then positively displaced pressure fluid flows via the conduits 48 to enter the upper annular space 51 of the inner double valve 15, and from there, now following the double arrows, flows through the first, inner valve opening—depending on the position of the inner valve body 15a—into the transverse conduit 35; passes through the second, outer valve in accordance with the flow opening or transverse opening 40; reaches the free space 42 on the right in the plane of the drawing; and exits through the check valve 46.

Parallel to these controlled flows of pressure fluid, compensation movements are possible as indicated by the arrows drawn in dashed lines, via additional axial openings 24, 25 in the piston 10 that are covered by their own check valves 24a, 25a. By the control of the active damping force component, a reaction takes place to buildup motions in the middle frequency range, while the adjustable passive damping force component enables a gradual or in other words slowly elapsing adaptation of the damping behavior; optionally, switchovers among various passive damping forces are also possible by means of suitable switch actuation.

Figure 2:
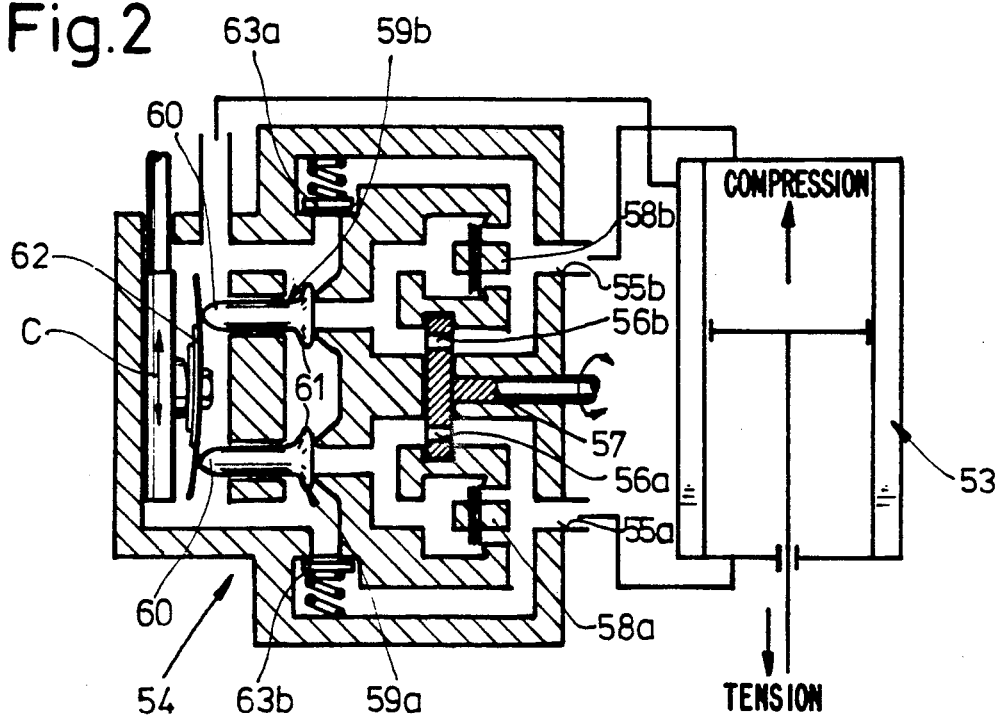
FIG. 2 is a schematic cross section, with an associated and likewise schematically embodied shock absorber part, of the valve region in an alternative embodiment, having a first rotary valve for determining the passive damping force component and a double disk valve that reacts asymmetrically with respect to the tension and compression stages, for determining the active damping force component.

FIG. 2 is a schematic function diagram of a valve region for the control of semi-active damping forces; the control means may be mounted externally on a shock-absorber-like structure and may for instance be used in the form of shock absorbers of the kind described below in conjunction with FIG. 4.

The piston/cylinder assembly of the shock absorber is identified by reference numeral 53. Via connecting lines, the particular positively displaced pressure fluid (hydraulic oil) flows to the valve unit 54, with its two inlets 55a, 55b, which is symmetrically embodied with respect to the tension and compression stages. The pressure fluid passes through flow openings 56a, 56b that determine the passive component of the shock absorber force, these being separate openings for the compression and tension stages and belonging to a common rotary valve 47 for determining the passive component; check valves 58a, 58b are disposed parallel to it. Taking note of the basic concept of the series connection of the "passive" and "active" valve regions, the rotary valve 57 is adjoined, again separately for the tension and compression stages, by disk valves 59a, 59b, which serve to control and monitor the active damping force adjustment. These disk valves 59a, 59b are embodied such that valve disks 61 actuated via tappets 60 cover flow openings with initial spring tension, the initial spring tension being generated by a leaf spring assembly 62. As the drawing shows, leaf springs of different lengths are stacked together such that a softer and softer spring action occurs, the farther outward the spring engagement point is located, in a manner approximately comparable to the spring assemblies in trucks.

Since here the leaf spring assembly 62 is axially displaceable relative to the cylinder 53 in the direction of the double arrow C, this displacement results in an opposite spring pressure action on the two valve disks; that is, the more markedly one tappet 60 moves into the stiff range of the spring action, the less is the spring force exerted on the other tappet, so that overall, for determining the active damping force component, an axial displacement of the leaf spring assembly results in an asymmetrical action, separately for the tension and compression action, upon the thus-embodied double valve comprising the two disk parts 59a, 59b.

The return flow, after passing through the disk valves, is via spring-biased check valves 63a, 63b. Once again the basic concept is employed of attaining variable flow openings in the valve region (rotary valve 57) by inducing only very slight control forces, or of embodying the biasing actions on the disk valves, and hence controls the actions of the disk valves, asymmetrically by the likewise recoil-free displacement of the leaf spring assembly 62.

Figure 3:
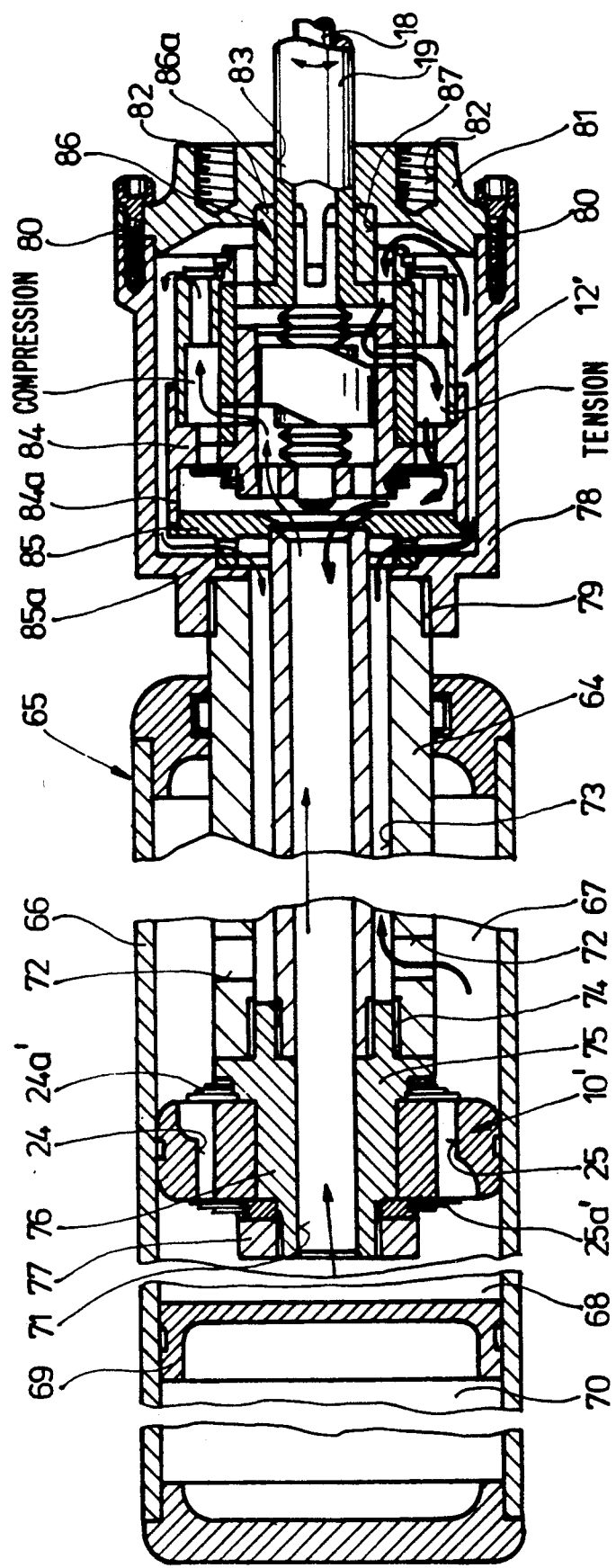
FIG. 3 shows an embodiment of a damping unit embodied in the manner of a McPherson strut, in which the valve region is disposed outside the piston/cylinder unit region but inside the piston rod which is extended out of that region.

The exemplary embodiment shown in FIG. 3 differs from the embodiment of FIG. 1 in terms of the structure and function of the valve unit 12' only in that here the valve unit is disposed at the end of the piston rod 64 which protrudes from the piston/cylinder assembly of the shock absorber unit or McPherson strut; the cylinder of the McPherson strut 65 thus formed is indicated at 66.

Those components and structural units of FIG. 3 that are identical or comparable in structure and function to those described above are identified by the same reference numerals, or if they differ only slightly then by the same numerals with a prime. The cylinder 66 of the McPherson strut 65 in FIG. 3 forms one pressure chamber 67 above the piston and one pressure chamber 68 below it; a gas 70 under pressure is located in the lower pressure chamber, separated from the remaining pressure chamber by its own small partitioning piston 69, thus compensating for the increased quantity of hydraulic pressure fluid when the primary piston 10' moves downward (compression stage). The piston rod 64 carrying the piston 10' has a plurality of separate longitudinal and transverse conduits, which provide for transporting of the pressure fluid to the valve unit 12'; a central first bore 71, also penetrating the primary piston 10', communicates with the lower pressure chamber 68, so that in the compression stage, following the arrows represented by single solid lines, the hydraulic oil can reach the valve unit 12;, where as already described fully in conjunction with the valve unit of FIG. 1, it can pass through the corresponding openings and conduits serving to generate the passive and active damping force components.

In a comparable manner, transverse conduits 72 are embodied in the shaft of the piston rod 64 and communicate with one or more annular conduits 73, which in the tension stage, following the double arrows, feed the hydraulic fluid out of the upper pressure chamber 67 to the valve unit and to the openings, which are controlled in accordance with the demand for the passive and active damping force components.

The primary piston 10' itself have the generally passively acting check valves 24a' and 25a' communicating with the longitudinal piston conduits 24 and 25. Securing of the primary piston 10' to the piston rod 64 can be done in the usual manner, with screw connections such as that shown at 74; the basic design of the piston is arbitrary. It may comprise a piston core 75 that is screwed to the piston rod and has a piston ring form 76 seated on it. The piston ring form 76 is secured via a screw ring 77 to the piston core 75, and in that case the corresponding valve ring washers for the check valves 24a', 25a' and other shims can be screwed to it, all at the same time.

The valve unit 12' disposed on the free outer piston end is seated in a markedly cup-shaped support head 78, which can be screwed at 79 to the end of the piston shaft. The support head 78 is covered by a cap 81 that is secured to the support head 78 by suitable fastening means such as screws 80. The cap 81 has screw openings 82, for flexible assembly of the entire unit to the body of the vehicle or the like, and a central flow bore 83, through which the rotary shafts 18 and 19 for the two double valves for controlling the active and passive damping components are guided. The remaining structure of the valve unit 12' is comparable in its basic form to that shown in FIG. 1 and is identical in function; to support a lower primary bearing part 84 approximately acting as a bearing for the lower housing part 14 of FIG. 1 and providing flow conduits for it, a platform-shaped annular support 85 is provided, which is screwed with an inner annular flange 85a into the region of the bottom of the cup-shaped support head 78 and receives a downwardly protruding annular flange 84a on the primary bearing part 84. By this means, the primary bearing part 84 is centered and supported and can also bear and receive the remaining structural parts; an upper bearing part 86, comparable to the upper housing part 13 of FIG. 1 and having approximately the same conduits and the same basic structure is received and retained with an inner central annular flange 86a in a corresponding fitting recess 87 in the cap 81.

The compensation for the increased quantity is effected in the McPherson strut of FIG. 3 by the action of the pressurized gas 70 in the lower compartment of the cylinder 66 that is partitioned off by the auxiliary piston 69, while in the exemplary embodiment of FIG. 1, a separate outlet container may additionally be provided for this purpose.

Figure 4:
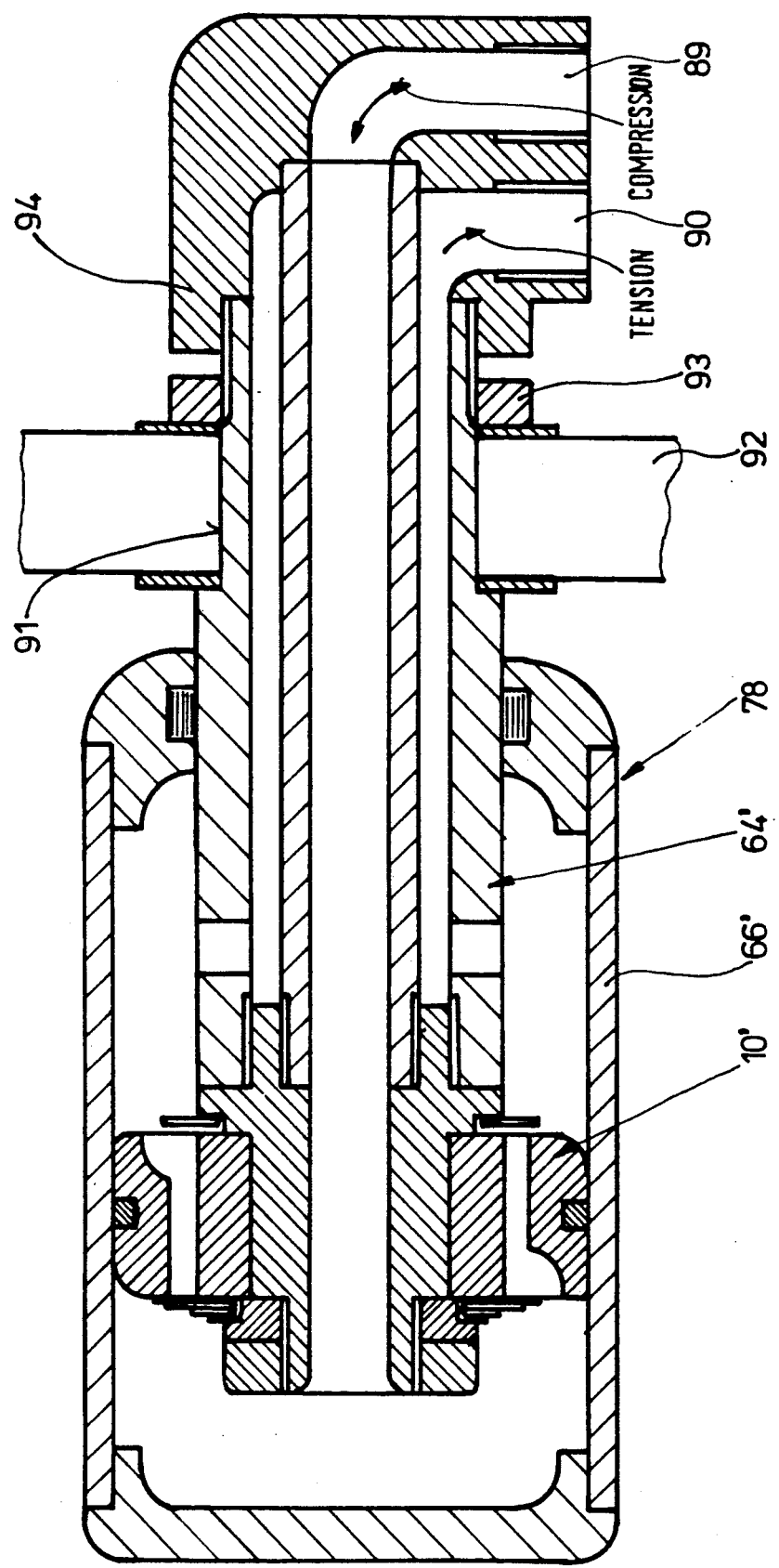
FIG. 4, again in cross section and schematically, shows a McPherson strut with a check valve and a pressure limiting valve in the piston region, and with longitudinal and transverse conduits in the piston rod, which lead to a valve region, disposed outside or directly on the piston rod, that may be embodied in the manner shown in FIG. 2 or in the manner shown in FIG. 5, which follows.

The embodiment of FIG. 4 makes it clear that on the basis of the division of the piston/cylinder assembly of the shock absorber or McPherson strut into a piston cylinder assembly 78 on the one hand, having the appropriate flow conduits for the hydraulic fluid as already described in conjunction with FIG. 3, and a valve unit on the other, which is also separately embodied and supported with respect to this McPherson strut, a great variety of embodiments is possible; the valve unit need merely be provided with two hydraulic line connections: 89 for the compression stage and 90 for the tension stage. The piston/cylinder assembly 78 can then be embodied as already described in detail in conjunction with FIG. 3, or in other words may be basically identical or comparable to the piston embodiment and the embodiment of the conduits penetrating the piston and piston rod, either with or without the separate lower pressure vessel for a gas 70 under pressure.

The structure of the piston/cylinder assembly 78 in FIG. 4, having the piston 10', the cylinder arrangement 66', and the piston rod 64', is identical to what is shown in FIG. 3 and therefore need not be described further here. The protruding piston rod is seated with a shoulder 91 on an external, stationary holder part 92 otherwise not shown, and is firmly connected to it via a screw collar 93. The piston rod penetrates the holder part 92 and has a continuous pressure flange 94 on its end for receiving and extending the connection of the hydraulic line connection 89, 90 to the valve unit, which may either be disposed elsewhere or flanged directly to it.

This valve unit may be embodied as described above in conjunction with FIG. 2, or may have the structure and function of the valve units shown in FIGS. 5 and 6, to be described below.

In FIG. 5, the piston/cylinder assembly is shown only schematically and is identified as a whole by reference numeral 78'. The two pressure lines 89' and 90' lead to a valve unit comprising a suitable housing 95 in which the valves executing double functions for the compression stage and the tension stage, for determining both the passive and the active damping force variable, are disposed in parallel alignment with one another and have the general structure and function of the inner double valve in FIG. 1 and the inner double valve in FIG. 3.

The valve unit 96 for a McPherson strut once again has separate "active" and "passive" damping force control; the upper plane of both valves, that is, the double valve 97 for adjusting the passive damping force variable and the double valve 98 for adjusting the active damping force variable, is associated with the compression stage, and more or less plays the role of a pedal valve, with the pressure exerted acting on the net surface area of the piston, while the lower plane of the two double valves 97 and 98 exerts the then operative pressure upon the annular face of the piston.

The housing 95 of the valve unit 96 includes two chambers 97a, 98a connected in line with one another, each receiving respective valve bodies 15a', 15a" having the form and function as described in detail in conjunction with element 15a in FIG. 1, so that no further description of these features is necessary here. Each valve body 15a', 15a" is supported on both sides via the aforementioned disk springs 36' on its own rotary shaft 97b, 98b; at both ends these shafts penetrate bores in the walls of the chambers 97a, 98a and therefore can be driven from outside. The two double valve bodies 15a', 15a" either cover hydraulic oil passages at different heights, these passages being completely separate from one another, or depending on the rotary positions assumed form with these passages variable valve openings for the compression stage (arrows shown in single lines) and tension stage (double arrows), which are connected in line with one another. The hydraulic line connection 89' for the compression stage has a line branch at 99, which via a check valve 100 that blocks in that direction communicates with a pressure fluid equalization vessel 101. The equalization vessel 101 serves to receive the increased quantity of fluid whenever the piston 10" of the cylinder/piston assembly of a corresponding McPherson strut or or a comparable shock absorber arrangement moves downward; the hydraulic oil first flows through a first valve opening 102, controlled by the upper edge of the valve body 15a', of the first double valve 97 and then through a second valve opening 103 of the following second double valve 98 to the external reservoir 101, which via the branch line and via the check valve 100 opens into the lower pressure chamber 102' of the piston/cylinder assembly 78'. Fluid may also flow via line 89' through passage 105, valve 15a, passage 104 and line 90' to the chamber above piston 78'.

The hydraulic line connection 90' for the tension stage meets a first valve opening 104, controlled by the lower peripheral edge of the valve body 15a" and then meets a further valve opening 105, controlled by the lower peripheral edge of the valve body 15a' through which fluid is directed to the other chamber 102'. It is understood that the line course may vary; for instance, it may be as described for the exemplary embodiments of FIGS. 1–4, in which case a pressure equalization vessel 101 can also be dispensed with. In the present case, successive tension valves (valve openings 104, 105) and successive compression valves (valve openings 102 and 103) are the result, which serve to initiate the active and passive damping force variables; as desired, transverse openings are also possible via the various valve regions for the tension and compression stages.

The exemplary embodiment shown in FIG. 6, as an alternative embodiment, adds to the possibilities in the successive disposition of (double) valves for the initiation or determination of the pasive and active damping force components corresponding to FIGS. 1–4 and 5, respectively, but here there is a concentric arrangement of the valves, with the double valve function achieved by means of distribution to various axial positions. In its basic function, the valve unit 106 of FIG. 6 functions as described in conjunction with FIG. 1; here, it is shown without the further components surrounding it and therefore may be disposed either in the piston or in a separate head part on one end of the piston rod of a shock absorber or McPherson strut.

In further detail, a stationary, middle, load-bearing cylindrical ring structure 107 is first provided, which in an inner cylindrical bore 108 receives a first valve body rotary element 109, which merges with a first, central, inner rotary or actuation shaft 110, for deriving the control variables required for the active damping force determination.

As in the exemplary embodiment of FIG. 1—having the outer cup-shaped valve body structure 38—here there are three concentrically internested cylindrical annular wall structures, with the middle, stationary ring structure 107; transverse conduit openings in all three wall structures can be aligned with one another by corresponding rotation to a variable extent to effect a valve-like shutoff or opening, finally resulting in the opening and flow structures as indicated by the single and double arrows, as are also found in the other types of valve units shown.

The sectional views of FIGS. 7 and 8 clearly show the various possibilities of angular positioning of the individual cylindrical ring structures relative to one another; the inner ring structure, that is, the valve body rotary part 109, serves to determine the active damping variables and an outer valve body rotary part 111 serves to determine the passive damping variables. Specifically, beginning at a middle base plate 112, the inner valve body rotary part 109 has cup-shaped annular protrusions 113, 114 oriented upward and downward, which at top and bottom have various transverse openings, not identified here by reference numerals, resulting in the usual double valve function. These transverse openings may be positioned more or less in alignment aimed at stationary transverse openings 115 in the stationary middle ring structure. Similarly, the generally cup-shaped basic form of the outer valve body rotary part 111 has transverse openings in its outer cylindrical wall, which then complete the series connection of the valve openings.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for damping resilient wheel suspension systems in vehicles, having a piston in a cylinder assembly in which the cylinder and the piston are separately connected to the body and the wheel/axle of the vehicle, respectively, said piston/piston rod including a valve unit (12, 12') which includes four damping valves including two separate coaxial double damping valves (15, 16), a signal detector (202), instantaneous signals representing dynamic driving conditions are detected and directed into said signal detector (202) and signals from said signal detector control rotational motions of said coaxial double damping valves (15, 16) to control said damping valves (15, 16) to control fluid flow through at least one of said four damping valves, wherein an operative damping force at any time is controlled in such a way that passive and active damping force components result, and whenever an instantaneous course of motion requires a supply of external energy to rotate said coaxial double damping valves (15, 16), the existing damping force is substantially nullified, wherein separate possibilities of acting upon a controlled pressure fluid are provided for a tension and a compression stage, in which said at least one of said four damping valves in said piston comprises a series connection of one of said two separate double damping valves (15, 16; 57, 59a, 59b', 97, 98), one for each motion direction (tension stage/compression stage), wherein one of said two separate double damping valves for both the tension and the compression stage each have one valve that determines an active damping component and one valve in series with it that determines a passive damping component, and that the two valves for the passive damping component and the two valves for the active damping component are each adjustable from outside by different adjusting means, one of said double damping valves (15; 15a', 15a") is positioned radially inside the other of said double damping valves and is an inner rotary valve having a body with a cylindrical outer contour which is offset axially and adjustable in height during rotation of said body, and that said body is supported resiliently axially by use of prestressed spring means on opposite ends thereof and is therefore displaceable in an axial direction because of fluid pressures exerted on said valves counter to a force of said prestressed spring means.

2. An apparatus as defined by claim 1, in which said rotary valve (15) is seated flush in a bore (30) of a stationary bearing element in a lower housing part (14); in which transverse conduits (34, 35; 102, 103, 104, 105) together with the valve bodies form flow valves the cross section of which is variable.

3. An apparatus as defined by claim 2, in which said inner rotary valve body (15a) is retained axially displaceably between said prestressed spring means, and that transitions of said cylindrical outer contour of said inner rotary valve (15, 15a", 15a") during rotation from an upper edge of said stationary bearing element to a lower position uncovers various stationary transverse conduits (34, 35) in said lower housing part, along a curve form that varies steadily and gradually.

4. An apparatus as defined by claim 2, wherein in said stationary bearing element, embodied by said lower housing part (14), for the inner rotary valve body (15a), said transverse conduits (34, 35) are adjoined toward the outside by further transverse conduits (39, 40), which thus form outer valves connected in series with inner valves, of an outer, cup-shaped, second valve body (38), which is likewise rotatably supported, and that the inner rotary valve body determines an active damping force component and the second valve body determines a passive damping force component.

5. An apparatus as defined by claim 4, in which a valve unit (12') is secured outside said piston/cylinder assembly (65) as a separate head part at an end of a hollow piston rod (64), and hydraulic connecting lines (71, 72) are embodied by longitudinal and transverse conduits in the hollow piston rod (64).

6. An apparatus as defined by claim 1, which includes check valves (24a, 25a) in parallel with series-connected, valve-like openings embodied by the two double damping valves for the tension and compression stages, and that said valve unit (12) is disposed in the piston of a shock-absorber-like structure, said piston includes a hollow piston shaft that serves as a passage for coaxial rotary shafts (18, 19) for rotatably adjusting both the inner and outer valve bodies (15a, 38).

7. An apparatus as defined by claim 6, in which a piston (10) that receives said valve unit (12) is embodied by an upper and a lower housing part (13, 14) which are fitted together to form free spaces (41, 42) located downstream of the series-connected adjustable valve openings, from which spaces a hydraulic pressure fluid (hydraulic oil) flows via check valves (43, 44, 45, 46) into respective upper and lower pressure chambers, separated by the piston (10) of the shock absorber.

8. An apparatus as defined by claim 7, in which said check valves are embodied by rings that cover the free spaces (41, 42) and are retained by clamping rings (47) screwed to the upper and lower housing part, respectively.

* * * * *